US011048455B1

(12) United States Patent
Armstrong

(10) Patent No.: US 11,048,455 B1
(45) Date of Patent: Jun. 29, 2021

(54) DEVICES, SYSTEMS, AND METHODS FOR RESOLVING CONFLICTING PRINT SETTINGS

(71) Applicant: CANON KABUSHIKI KAISHA, Tokyo (JP)

(72) Inventor: Charles Thomas Armstrong, Rancho Santa Margarita, CA (US)

(73) Assignee: Canon Kabushiki. Kaisha, Tokyo (JP)

( * ) Notice: Subject to any disclaimer, the term of this patent is extended or adjusted under 35 U.S.C. 154(b) by 0 days.

(21) Appl. No.: 16/808,971

(22) Filed: Mar. 4, 2020

(51) Int. Cl.
*G06F 3/12* (2006.01)
*G06N 20/00* (2019.01)

(52) U.S. Cl.
CPC .......... *G06F 3/1255* (2013.01); *G06F 3/1208* (2013.01); *G06F 3/1257* (2013.01); *G06N 20/00* (2019.01)

(58) Field of Classification Search
CPC .... G06F 3/1255; G06F 3/1208; G06F 3/1257; G06N 20/00
USPC ........................................................ 358/1.15
See application file for complete search history.

(56) References Cited

U.S. PATENT DOCUMENTS

| | | | |
|---|---|---|---|
| 6,975,417 B1 * | 12/2005 | Hilpl | G03G 15/50 358/1.13 |
| 8,994,985 B2 | 3/2015 | Young | |
| 2009/0174895 A1 * | 7/2009 | Huster | G06F 3/1261 358/1.15 |
| 2009/0217268 A1 | 8/2009 | Pandit | |
| 2012/0218576 A1 * | 8/2012 | Sekine | G06F 3/122 358/1.13 |
| 2013/0033723 A1 | 2/2013 | Lombardo | |
| 2013/0208298 A1 | 8/2013 | Morimoto | |
| 2014/0036296 A1 * | 2/2014 | Armstrong | G06F 3/1226 358/1.14 |
| 2015/0124284 A1 | 5/2015 | Ward | |
| 2016/0210091 A1 * | 7/2016 | Martin | G06F 3/1288 |
| 2016/0259600 A1 | 9/2016 | Verdun | |

FOREIGN PATENT DOCUMENTS

JP 2014-232503 A 12/2014

* cited by examiner

*Primary Examiner* — Allen H Nguyen
(74) *Attorney, Agent, or Firm* — Canon U.S.A., Inc. IP Division

(57) ABSTRACT

Devices, systems, and methods obtain a print job, wherein the print job includes printing content, a plurality of respective selected print-settings options for a plurality of print settings, and print-job metadata; determine if the print job includes one or more print-setting conflicts based on the plurality of selected print-settings options and on a first machine-learning model, wherein the first machine-learning model accepts the selected print-settings options as inputs and outputs an indicator that indicates whether the print job includes one or more print-setting conflicts; and generate respective resolutions that include a respective resolution for each of the one or more print-setting conflicts based on a second machine-learning model, wherein the second machine-learning model accepts the plurality of selected print-settings options as inputs, and wherein the second machine-learning model outputs the respective resolutions.

18 Claims, 14 Drawing Sheets

1112

| Resolution Group | Confidence Score | Print Setting | Selected Option |
|---|---|---|---|
| 1 | 0.52 | Duplex | Off |
| | | Staple | Top left |
| 2 | 0.34 | Orientation | Portrait |
| | | Borderless | Off |
| 3 | 0.11 | Orientation | Portrait |
| | | Duplex | Long Edge |
| | | Staple | Off |

FIG. 11

DEVICES, SYSTEMS, AND METHODS FOR RESOLVING CONFLICTING PRINT SETTINGS

BACKGROUND

Technical Field

This application generally concerns resolving conflicting print settings.

Background

Many printers support multiple print settings that can be adjusted by a user. Each print setting supports two or more print-setting options. For example, if the print setting is page size, then the print setting may support at least the following print-settings options: letter, legal, and A4. The variety of print settings and print-settings options allow a printer to realize a user's printing intent.

SUMMARY

Some embodiments of a device comprise one or more computer-readable storage media and one or more processors in communication with the one or more computer-readable storage media. The one or more computer-readable storage media and the one or more processors are configured to cause the device to obtain a print job, wherein the print job includes printing content, a plurality of respective selected print-settings options for a plurality of print settings, and print-job metadata; determine if the print job includes one or more print-setting conflicts based on the plurality of selected print-settings options and on a first machine-learning model, wherein the first machine-learning model accepts the selected print-settings options as inputs and outputs an indicator that indicates whether the print job includes one or more print-setting conflicts; and generate respective resolutions that include a respective resolution for each of the one or more print-setting conflicts based on a second machine-learning model, wherein the second machine-learning model accepts the plurality of selected print-settings options as inputs, and wherein the second machine-learning model outputs the respective resolutions.

Some embodiments of a method comprise obtaining a print job, wherein the print job includes printing content, a plurality of respective selected print-settings options, each of which corresponds to one of a plurality of print settings, and print-job metadata; inputting the plurality of respective selected print-settings options into a first machine-learning model that outputs either (i) an indicator that the print job includes one or more print-setting conflicts or (ii) an indicator that the print job does not include any print-setting conflicts; inputting the plurality of respective selected print-settings options into a second machine-learning model that outputs respective resolutions that include updated print-setting options that resolve each of the one or more print-setting conflicts; and modifying the plurality of respective selected print-settings options based on the respective resolutions.

Some embodiments of one or more computer-readable storage media store instructions that, when executed by one or more computing devices, cause the one or more computing devices to perform operations that comprise storing a first machine-learning model and a second-machine learning model; obtaining a print job, wherein the print job includes printing content, selected print-setting options that include a respective selected print-settings option for each of a plurality of print settings, and print-job metadata; inputting the selected print-settings options to the first machine-learning model, which outputs an indicator that indicates whether the print job includes any print-setting conflicts; inputting the selected print-settings options into the second machine-learning model, which outputs one or more recommended print-setting options; and, based on the one or more recommended print-setting options, performing one or both of changing at least one of the selected print-settings options according to the one or more recommend print-setting options and sending a message to a user-interface device.

BRIEF DESCRIPTION OF THE DRAWINGS

FIG. 11 illustrates an example embodiment of resolutions and scores.

DESCRIPTION

The following paragraphs describe certain explanatory embodiments. Other embodiments may include alternatives, equivalents, and modifications. Additionally, the explanatory embodiments may include several features, and a particular feature may not be essential to some embodiments of the devices, systems, and methods that are described herein.

Figure 1:
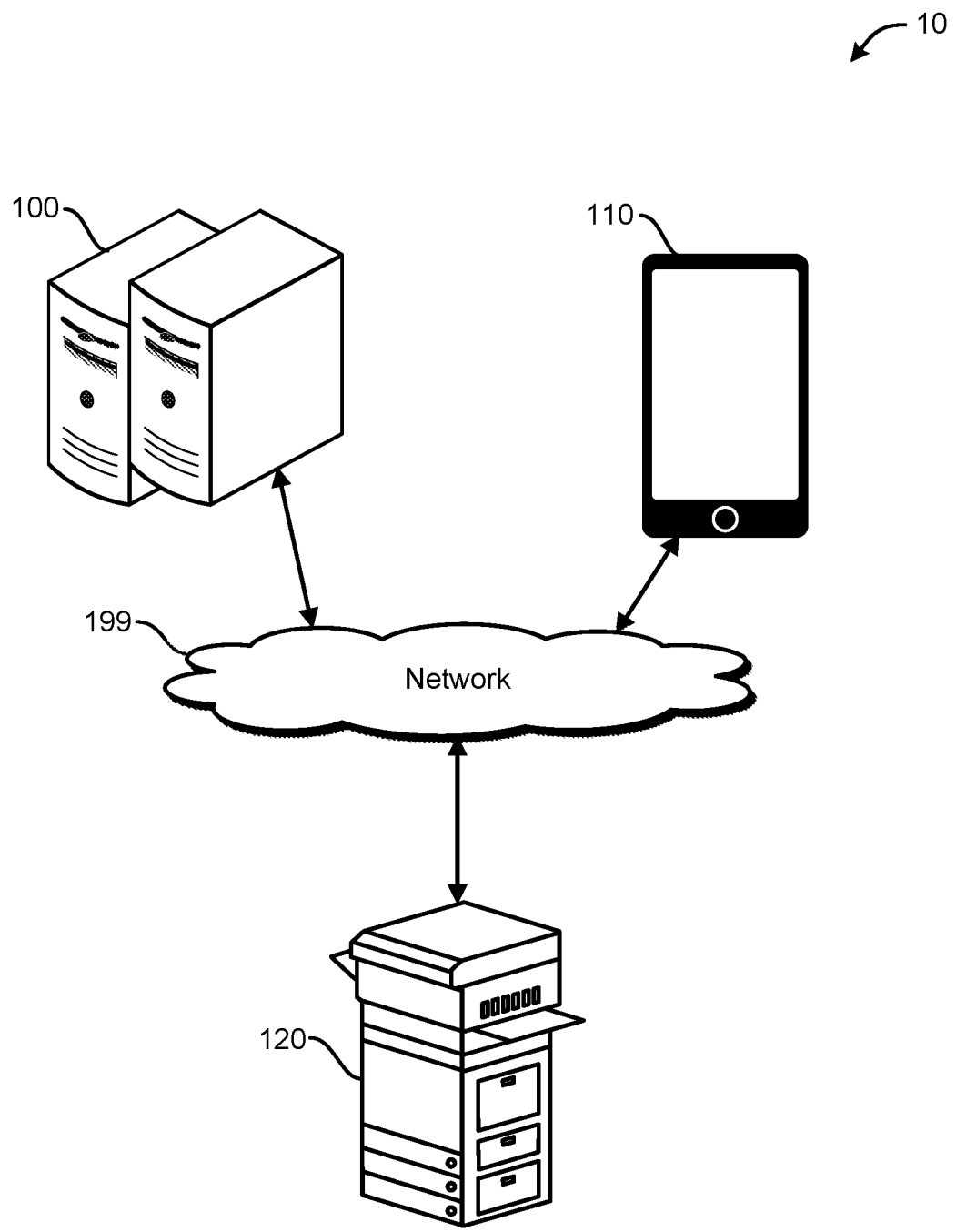
FIG. 1 illustrates an example embodiment of a printing system.

FIG. 1 illustrates an example embodiment of a printing system 10. The printing system includes one or more print-setting-resolution devices 100, a user device 110, and an image-forming device 120. In this embodiment, the one or more print-setting-resolution devices 100, the user device 110, and the image-forming device 120 communicate via one or more networks 199, which may include a wired network, a wireless network, a LAN, a WAN, a MAN, and a PAN. Also, in some embodiments of the system 10, the devices communicate via other wired or wireless channels. In some embodiments, the one or more print-setting-resolution devices 100 are located in a cloud, and the printing system is configured to implement cloud printing.

The one or more print-setting-resolution devices 100 include one or more specially-configured computing devices. Examples of computing devices include the following: servers, workstations, desktop computers, laptop computers, tablet computers, and mainframes.

In FIG. 1, the user device 110 is a mobile device (e.g., a mobile phone, a personal digital assistant (PDA), a tablet computer) that is capable of communicating via a network and that includes at least one display device. In other embodiments, the user device may be another computing device instead of the mobile device 110.

The image-forming device 120 is an additive manufacturing device (e.g., an inkjet printer, a laser printer, a three-dimensional printer) or a subtractive manufacturing device that generates an image (e.g., a two-dimensional image, a three-dimensional image) from or on one or more media (e.g., paper, plastic, metal, paint, adhesive, ink, toner). Although the image-forming device 120 may be a subtractive manufacturing device, for purposes of description the term "print" refers to any image forming from or on one or more media by the image-forming device 120.

The user device 110 sends a print job to the one or more print-setting-resolution devices 100, and the print job includes selected print-setting options. The selected print-setting options include options that are selected by default and include options that are particularly selected by the user, for example in a print-dialogue interface. The one or more print-setting-resolution devices 100 check the selected print-settings options for conflicts. Print settings include, but are not limited to, media size, borderless printing, duplexing, media type, resolution, colors, orientation, copying, collating, media quality, print quality, and margins. A print-setting option defines a configuration for a setting (e.g., gray scale is an option for color, letter size is an option for media size, landscape is an option for orientation), and a set of some or all of the available options for a print setting are the capabilities of the respective print setting. The image-forming device 120 may not be able to implement every print-setting option for every print setting with every other print-setting option of every other print setting. For example, the image-forming device 120 may not be able to implement borderless printing with a top-left staple position or may not be able to implement duplex printing with a legal media size. If a print job includes selected print-setting options that the image-forming device 120 cannot implement together, then the print job includes one or more print-setting conflicts. Also, when the selection of a print-setting option of a first print setting reduces the set of print-setting options of a second print setting that are available, then the second print setting is constrained.

If the one or more print-setting-resolution devices 100 determine that the print job includes one or more conflicts, then the one or more print-setting-resolution devices 100 attempt to resolve the one or more conflicts by adjusting one or more selected print-setting options. Also, to resolve the one or more conflicts, the one or more print-setting-resolution devices 100 may determine to contact the user to obtain user input.

The one or more print-setting-resolution devices 100 use one or more machine-learning models to detect print-setting conflicts, resolve print-setting conflicts, and determine whether to contact a user to obtain user input. Also, the print-setting-resolution devices 100 may continually update one or more of the machine-learning models. Furthermore, the one or more print-setting-resolution devices 100 may not have a device-specific driver for the image-forming device 120. Thus, the one or more print-setting-resolution devices 100 can detect and revolve print-setting conflicts without using a device-specific driver. One example of a situation where this may be advantageous is a cloud-printing system where the user device 110 and the one or more print-setting-resolution devices 100 do not have a device-specific driver for the image-forming device 120.

Figure 2:
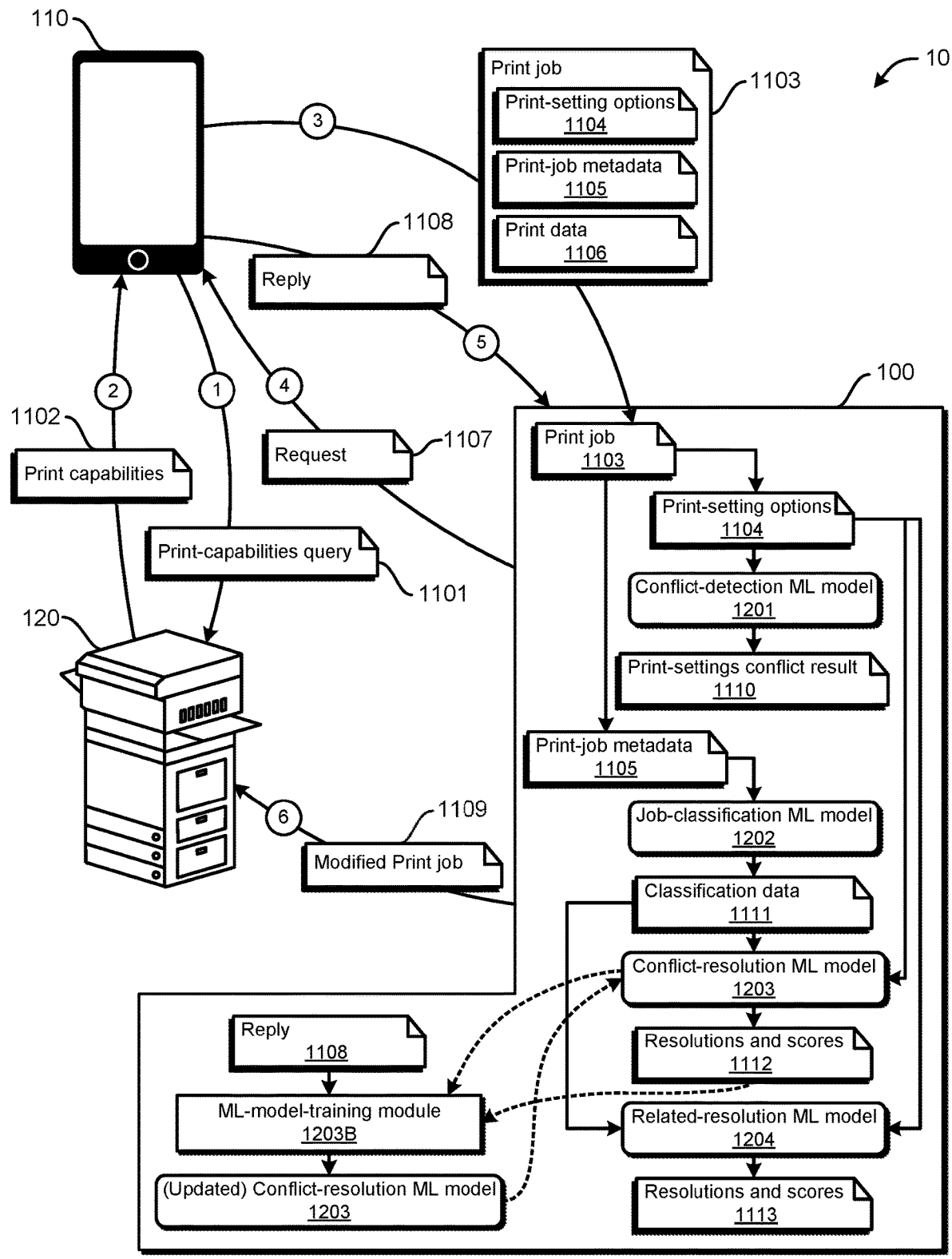
FIG. 2 illustrates the flow of data in an example embodiment of a printing system.

FIG. 2 illustrates the flow of data in an example embodiment of a printing system 10. The printing system includes a print-setting-resolution device 100, a user device 110, and an image-forming device 120. The print-setting-resolution device 100, the user device 110, and the image-forming device 120 communicate via one or more networks. In stage 1, the user device 110 sends a print-capabilities query 1101 to the image-forming device 120. The print-capabilities query 1101 requests the print capabilities of the image-forming device 120.

In stage 2, the image-forming device 120 sends a communication that includes the print capabilities 1102 to the user device 110, for example in the form of an XML file.

In stage 3, the user device 110 sends a print job 1103 to the print-setting-resolution device 100. The print job 1103 includes selected print-setting options 1104, print-job metadata 1105, and print data 1106. The print data 1106 includes the data that is to be printed on a recording medium (e.g., paper). The print-job metadata 1105 include other data that do not define print-setting options 1104 and that do not define print data 1106, such as, for example, a file name of the print job, a name of the user who submitted the print job, a time when the print job was created or submitted, a user-device identifier, a user workgroup, and an enterprise that the user belongs to.

After the print-setting-resolution device 100 obtains the print job 1103, the print-setting-resolution device 100 inputs the print-setting options 1104 into a conflict-detection machine-learning (ML) model 1201. The conflict-detection machine-learning model 1201 is a model that is trained to produce a print-settings conflict result 1110. In this embodiment, the print-settings conflict result 1110 indicates one (but not both simultaneously) of the following: (1) no print-settings conflict detected, and (2) at least one print-settings conflict detected.

If the print-settings conflict result 1110 indicates that at least one print-settings conflict is detected, then the print-setting-resolution device 100 inputs the print-job metadata 1105 into a job-classification machine-learning model 1202. The job-classification machine-learning model 1202 is trained to output classification data 1111 based on the print-job metadata 1105. The classification data 1111 describes one or more additional classifications about the print job 1103 that are not included in the print job 1103, such as, for example, the following: print-job importance and print-job use (e.g., work, personal, legal, presentation, draft).

The print-setting-resolution device 100 inputs the classification data 1111 and the print-setting options 1104 into a conflict-resolution machine-learning model 1203, which outputs one or more resolutions 1112 for the print-setting conflicts. Also, the conflict-resolution machine-learning model 1203 may output respective confidence scores for the one or more resolutions 1112. For example, the one or more resolutions 1112 may include multiple resolution groups, each of which may include one or more changes to the print-setting options, and respective confidence scores for each of the resolution groups. Additionally, a conflict-resolution machine-learning model 1203 may be device specific, user specific, or both. Thus, the print-setting-resolution device 100 may include a plurality of conflict-resolution machine-learning models 1203, each of which is specific to a different image-forming device or a different user.

If at least one of the confidence scores exceeds a threshold, the print-setting-resolution device 100 may select, from the one or more resolutions 1112 that have confidence scores that exceed the threshold, the resolution or resolution group that has the highest confidence score. The print-setting-resolution device 100 may then modify the selected print-setting options of the print job 1103 in accordance with the resolution or resolution group that has the highest confidence score and send the modified print job 1109 to the image-forming device 120.

In some embodiments, if none of the confidence scores of the one or more resolutions 1112 exceed a threshold, the print-setting-resolution device 100 communicates with the user device 110 to obtain user input to resolve any print-setting conflicts. The print-setting-resolution device 100 may send one or more requests 1107 to the user device 110 in stage 4, and the print-setting-resolution device 100 may receive one or more replies 1108 from the user device 110 in stage 5. The replies 1108 may indicate one or more resolutions to the print-setting conflicts. The print-setting-resolution device 100 may then modify the selected print-setting options of the print job 1103 in accordance with the one or more replies 1108 and send the modified print job 1109 to the image-forming device 120 in stage 6.

Also, in some embodiments, if none of the confidence scores in the resolutions and scores 1112 exceed a threshold, the print-setting-resolution device 100 inputs the classification data 1111 and the print-setting options 1104 into a related-resolution machine-learning model 1204, which also outputs one or more resolutions 1113 for the print-setting conflicts. And the related-resolution machine-learning model 1204 may output respective confidence scores for the one or more resolutions 1113. However, the related-resolution machine-learning model 1204 is trained using different data than the conflict-resolution machine-learning model 1203. For example, in some embodiments where each conflict-resolution machine-learning model 1203 is specific to a user or group of users, the related-resolution machine-learning model 1204 is a conflict-resolution machine-learning model that is specific to a different user or group of users. Also for example, the conflict-resolution machine-learning model 1203 and the related-resolution machine-learning model 1204 could initially be trained with the same base model and then re-trained with different training datasets. In some embodiments, the conflict-resolution machine-learning model 1203 is re-trained with a department-wide print-conflict-resolutions history, and the related-resolution machine-learning model 1204 is re-trained with a company-wide print-conflict-resolutions history. And in some embodiments, the conflict-resolution machine-learning model 1203 is re-trained with a company-wide print-conflict-resolutions history, and the related-resolution machine-learning model 1204 is re-trained with a department-wide print-conflict-resolutions history. If at least one of the confidence scores of the one or more resolutions 1113 exceeds a threshold, the print-setting-resolution device 100 may select, from the one or more resolutions 1113 that have confidence scores that exceed the threshold, the resolution or resolution group that has the highest confidence score. The print-setting-resolution device 100 may then modify the selected print-setting options 1104 of the print job 1103 in accordance with the resolution or resolution group that has the highest confidence score, thereby generating a modified print job 1109, and send the modified print job 1109 to the image-forming device 120 in stage 6.

In some embodiments, if none of the confidence scores of the one or more resolutions 1113 exceed a threshold, the print-setting-resolution device 100 communicates with the user device 110 to obtain user input to resolve any print-setting conflicts. In stage 4, the print-setting-resolution device 100 may send one or more requests 1107 to the user device 110, and, in stage 5, the print-setting-resolution device 100 may receive one or more replies 1108 from the user device 110. The replies 1108 may indicate one or more resolutions to the print-setting conflicts. The print-setting-resolution device 100 may then modify the selected print-setting options of the print job 1103 in accordance with the one or more replies 1108, thereby generating a modified print job 1109, and send the modified print job 1109 to the image-forming device 120 in stage 6.

Also, after receiving the one or more replies 1108, the print-setting-resolution device 100 may input the one or more replies 1108 and the conflict-resolution machine-learning model 1203 into a machine-learning-model-training module 1203B (described further in FIG. 12), which modifies (e.g., re-trains) the conflict-resolution machine-learning model 1203 based on the one or more replies 1108. Thus, as the print-setting-resolution device 100 receives replies 1108, the print-setting-resolution device 100 improves the conflict-resolution machine-learning model 1203, which improves the confidences scores of the resolutions 1112, which reduces the number of situations in which the print-setting-resolution device 100 sends one or more requests 1107 to the user device 110 and increases the number of situations in which the print-setting-resolution device 100 can resolve any print-settings conflicts without further user input.

Additionally, some embodiments of the print-setting-resolution device 100 include a detection-and-resolution machine-learning model that performs the functions of both the conflict-detection machine-learning model 1201 and the conflict-resolution machine-learning model 1203. Such embodiments of the print-setting-resolution device 100 may omit the conflict-detection machine-learning model 1201 and the conflict-resolution machine-learning model 1203.

Figure 3A:
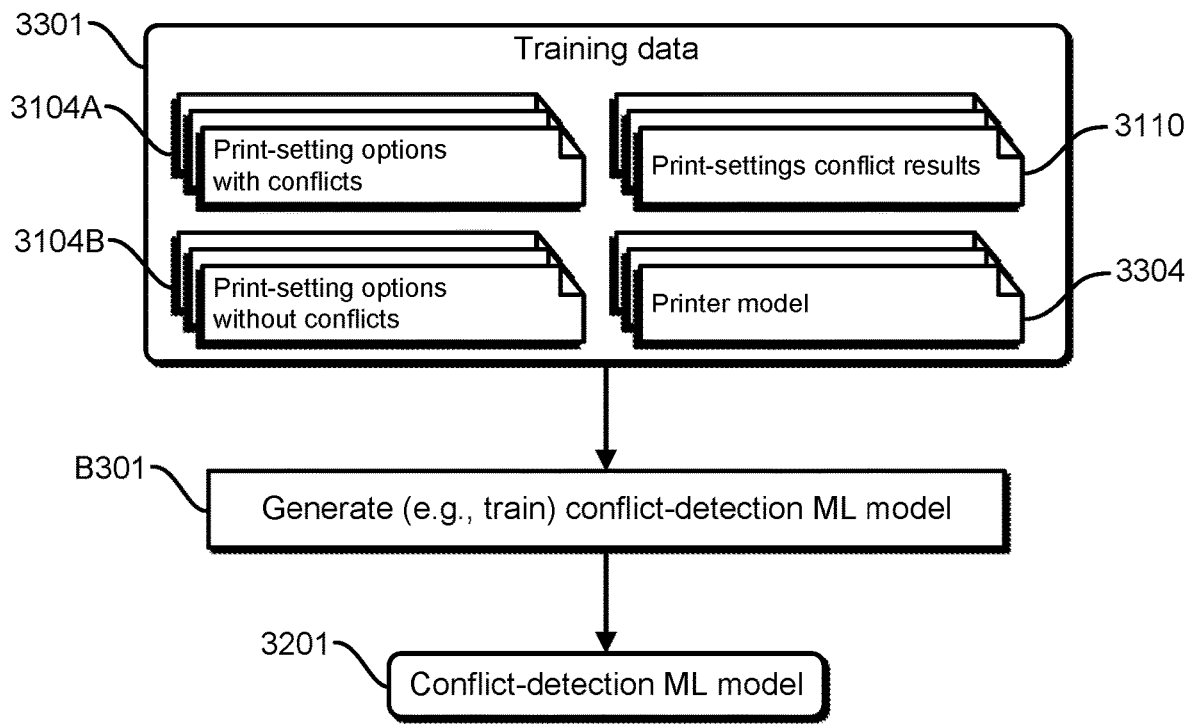
FIG. 3A illustrates an example embodiment of an operational flow for training a conflict-detection machine-learning model.

FIG. 3A illustrates an example embodiment of an operational flow for training a conflict-detection machine-learning model. Although this operational flow and the other operational flows that are described herein are performed by a print-setting-resolution device, some embodiments of these operational flows are performed by two or more print-setting-resolution devices or by one or more other specially-configured computing devices.

In FIG. 3A, in block B301, the print-setting-resolution device obtains training data 3301 and generates a conflict-detection machine-learning model 3201 based on the training data 3301. The training data 3301 include print-setting options with conflicts 3104A; print-setting options without conflicts 3104B; respective print-settings conflict results 3110 for each of the print-setting options with conflicts 3104A and print-setting options without conflicts 3104B; and a respective printer model 3304 for each of the respective print-settings conflict results 3110. Also, some embodiments train a respective device-specific conflict-detection machine-learning model for each printer model, and thus can omit the printer model 3304 in the training data 3301. Additionally, if other information about the image-forming device is available (e.g., a PrintTicket, a PrintCapabilities), this information may also be used to train the conflict-detection machine-learning model 3201.

Figure 3B:
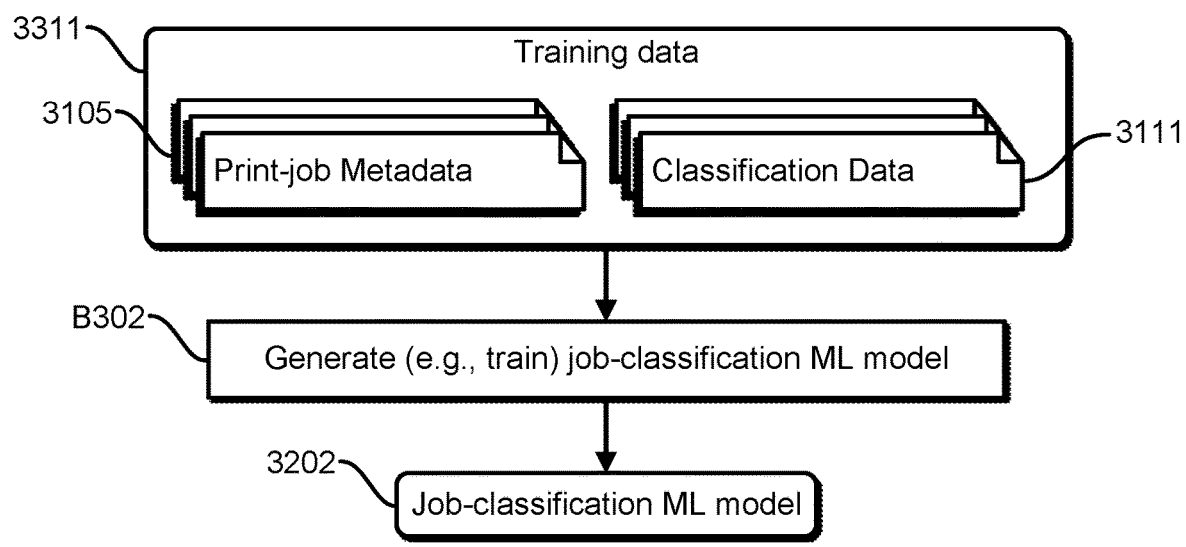
FIG. 3B illustrates an example embodiment of an operational flow for training a job-classification machine-learning model.

FIG. 3B illustrates an example embodiment of an operational flow for training a job-classification machine-learning model. In block B302, the print-setting-resolution device obtains training data 3311 and generates a job-classification machine-learning model 3202 based on the training data 3311. The training data 3311 includes a plurality of sets of print-job metadata 3105 and respective classification data 3111 for each of the sets of print-job metadata.

Figure 4A:
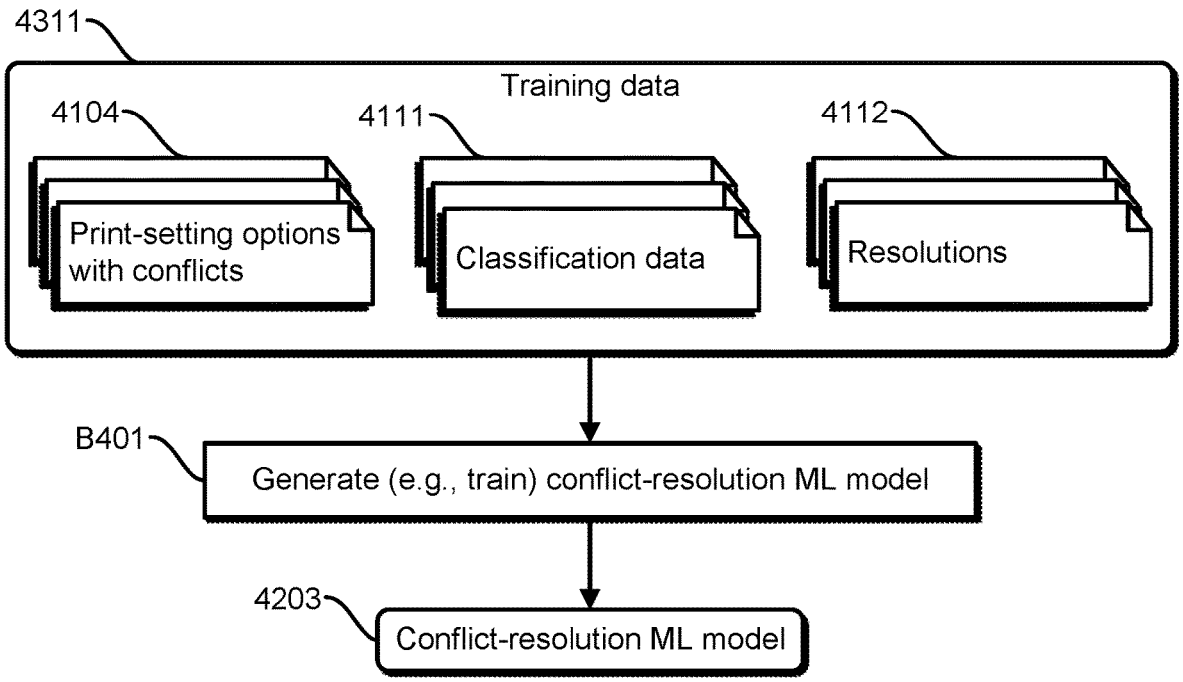
FIG. 4A illustrates an example embodiment of an operational flow for training a conflict-resolution machine-learning model.

FIG. 4A illustrates an example embodiment of an operational flow for training a conflict-resolution machine-learning model. In block B401, the print-setting-resolution device obtains training data 4311 and generates a conflict-resolution machine-learning model 4203 based on the training data 4311. The training data 4311 includes a plurality of print-setting options with conflicts 4104, respective classification data 4111 for each of the print-setting options with conflicts 4104, and respective resolutions 4112 for each pair of one of the print-setting options with conflicts 4104 and the respective classification data 4111. Additionally, if other information about the image-forming device is available (e.g., a PrintTicket, a PrintCapabilities), this information may also be used to train the conflict-resolution machine-learning model 4203.

Figure 4B:
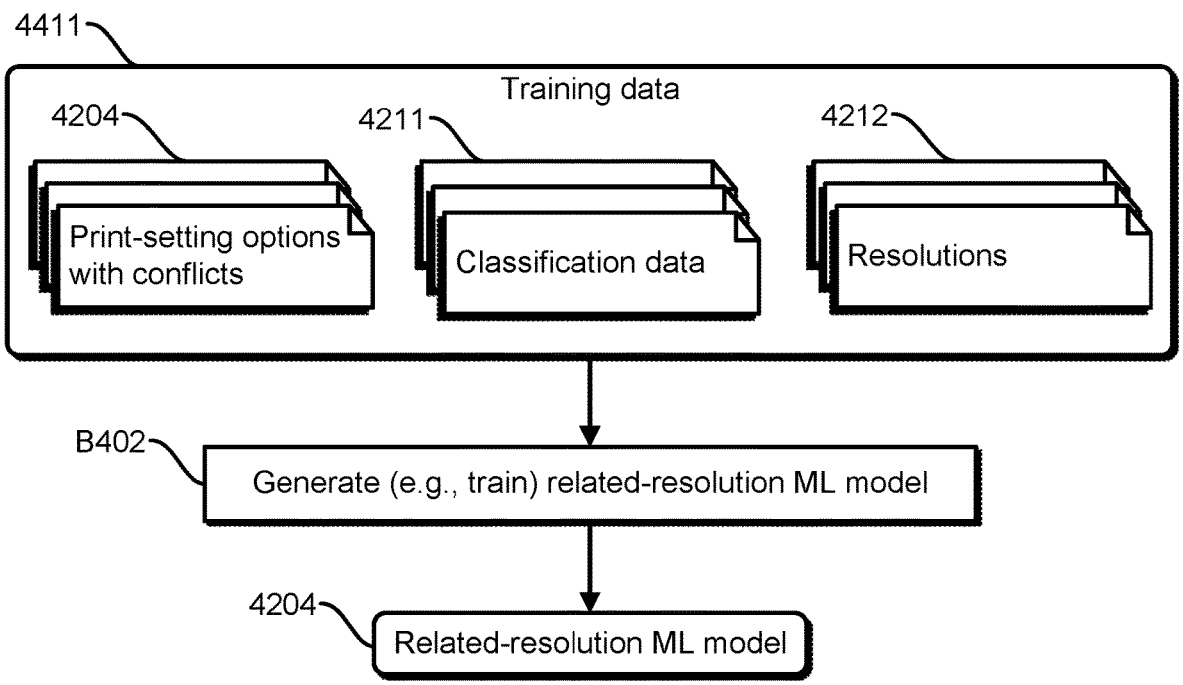
FIG. 4B illustrates an example embodiment of an operational flow for training a related-resolution machine-learning model.

FIG. 4B illustrates an example embodiment of an operational flow for training a related-resolution machine-learning model. In block B402, the print-setting-resolution device obtains training data 4411 and generates a related-resolution machine-learning model 4204 based on the training data 4411. The training data 4411 includes a plurality of print-setting options with conflicts 4204, respective classification data 4211 for each of the print-setting options with conflicts 4204, and respective resolutions 4212 for each pair of one of the print-setting options with conflicts 4204 and the respective classification data 4211.

Figure 5:
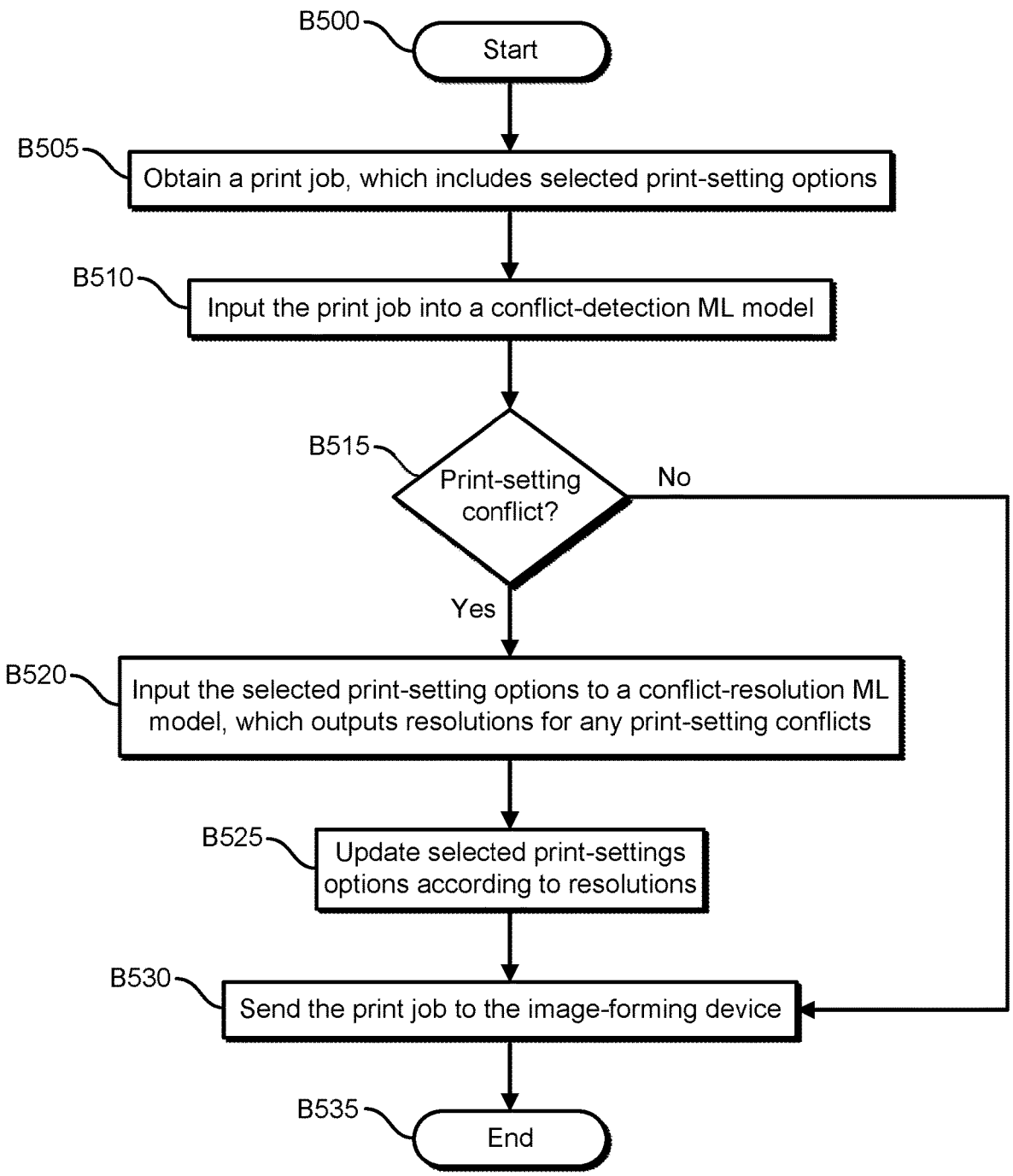
FIG. 5 illustrates an example embodiment of an operational flow for resolving print-setting conflicts.

FIG. 5 illustrates an example embodiment of an operational flow for resolving print-setting conflicts. Although this operational flow and other operational flows that are described herein are each presented in a certain respective order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations (e.g., blocks) from more than one of the operational flows that are described herein. Thus, some embodiments of the operational flows may omit blocks, add blocks (e.g., include blocks from other operational flows that are described herein), change the order of the blocks, combine blocks, or divide blocks into more blocks relative to the example embodiments of the operational flows that are described herein.

The operational flow in FIG. 5 starts in block B500 and then proceeds to block B505, where a print-setting-resolution device obtains a print job, which includes selected print-setting options. Next, in block B510, the print-setting-resolution device inputs the selected print-setting options into a conflict-detection machine-learning model, which outputs results that indicate whether the selected print-setting options include any print-setting conflicts.

The flow then moves to block B515, where the print-setting-resolution device determines whether the results from the conflict-detection machine-learning model indicate that the selected print-setting options include any print-setting conflicts. If the print-setting-resolution device determines that the results from the conflict-detection machine-learning model indicate that the selected print-setting options do not include any print-setting conflicts (B515=No), then the flow moves to block B535. If the print-setting-resolution device determines that the results from the conflict-detection machine-learning model indicate that the selected print-setting options do include one or more print-setting conflicts (B515=Yes), then the flow moves to block B520.

In block B520, the print-setting-resolution device inputs the selected print-setting options to a conflict-resolution machine-learning model, which outputs resolutions for any print-setting conflicts. Then, in block B525, the print-setting-resolution device updates the selected print-setting options of the print job according to the resolutions. Next, in block B530, the print-setting-resolution device sends the print job to the image-forming device, and the flow ends in block B535.

Figure 6:
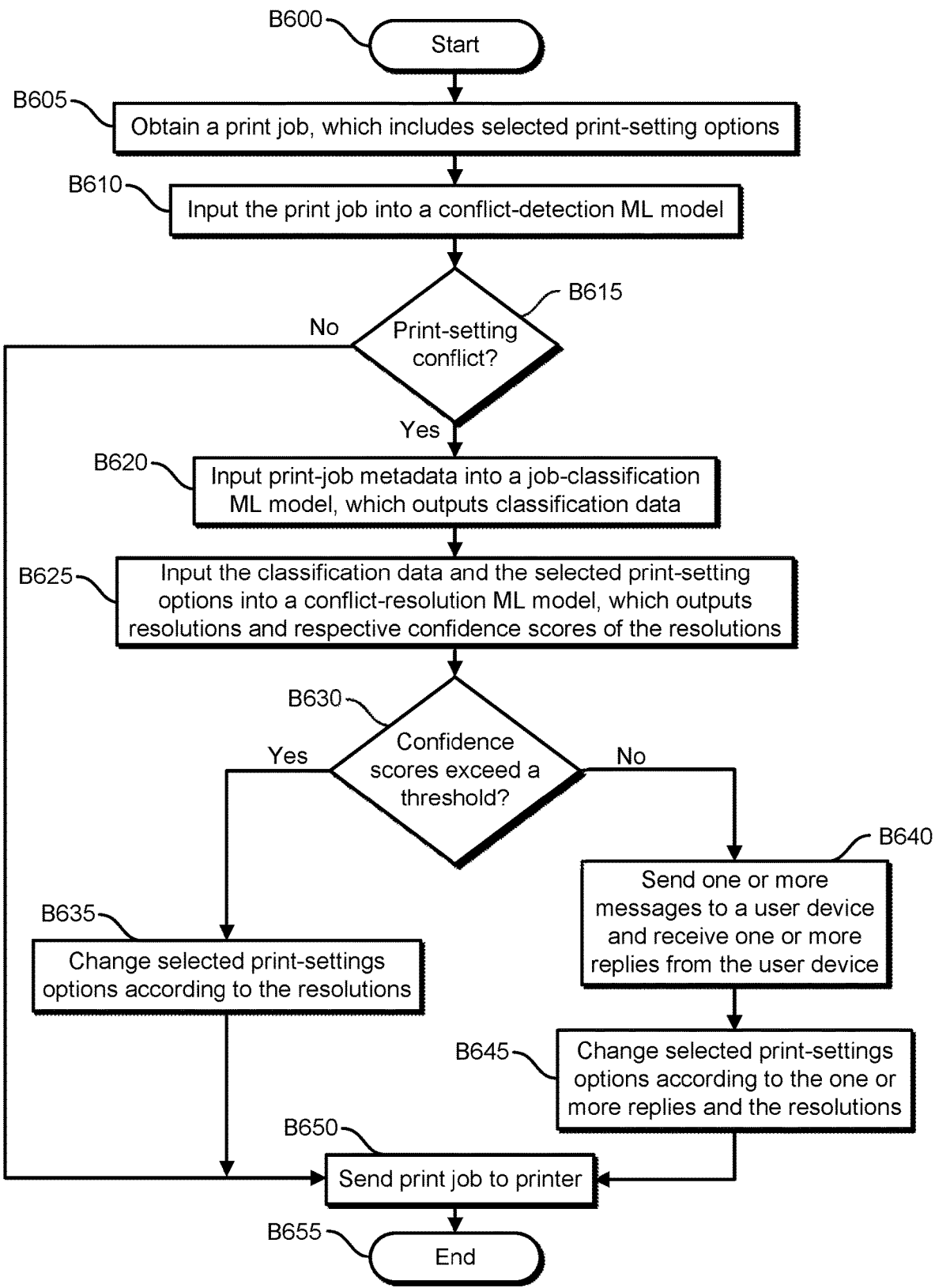
FIG. 6 illustrates an example embodiment of an operational flow for resolving print-setting conflicts.

FIG. 6 illustrates an example embodiment of an operational flow for resolving print-setting conflicts. The description of FIG. 6 will also refer to an illustrative example of a print job that has the following selected print-setting options: paper size: legal; output method: collate; and staple: left—double.

The flow starts in block B600 and then moves to block B605, where a print-setting-resolution device obtains a print job, which includes one or more selected print-setting options. As noted above, the example print job has the following selected print-setting options: paper size: legal; output method: collate; and staple: left—double.

Then, in block B610, the print-setting-resolution device inputs the print job into a conflict-detection machine-learning model, which outputs either (1) an indicator that the selected print-setting options have a conflict, or, alternatively, (2) an indicator that the selected print-setting options do not have a conflict. For the example print job, the conflict-detection machine-learning model outputs "yes" in response to the input of the example print job because the selected option for paper size (legal) conflicts with the selected option for staple (left—double).

Next, in block B615, the print-setting-resolution device determines whether the selected print-setting options have a conflict based on the output of the conflict-detection machine-learning model. If the print-setting-resolution device determines that the selected print-setting options do not have a conflict (B615=No), then the flow moves to block B650. If the print-setting-resolution device determines that the selected print-setting options do have a conflict (B615=Yes), then the flow moves to block B620. For the example print job, the print-setting-resolution device determines that the selected print-setting options do have a conflict.

In block B620, the print-setting-resolution device inputs the print-job metadata into a job-classification machine-learning model, which outputs classification data. For the example print job, the job-classification machine-learning model outputs the following classification data: job type: work; and importance: medium.

The flow then moves to block B625, where the print-setting-resolution device inputs the classification data and the selected print-setting options into a conflict-resolution machine-learning model, which outputs resolutions and respective confidence scores of the resolutions. Also, the resolutions may be organized into resolution groups, and each resolution group may have a respective confidence score. For the example print job, the conflict-resolution machine-learning model outputs the following resolutions and confidence scores:

Resolution (1): change paper size to letter; confidence score is 0.46.

Resolution (2): change staple position to lower left; confidence score is 0.35.

Next, in block B630, the print-setting-resolution device determines if the confidence score of any resolution or resolution group exceeds a threshold. If the confidence score of at least one resolution or resolution group exceeds the threshold (B630=Yes), then the flow moves to block B635. If no resolution or resolution group has a confidence score that exceeds the threshold (B630=No), then the flow moves to block B640. For the example print job, the threshold is 0.55, so the print-setting-resolution device determines that none of the confidence scores (0.46 and 0.35) exceed the threshold.

In block B635, the print-setting-resolution device changes the selected print-setting options of the print job according to the resolution or resolution group that has the highest confidence score, and then the flow proceeds to block B650.

In block B640, the print-setting-resolution device sends one or more messages to a user device and receives one or more replies from the user device. The one or more messages include one or more requests for input from the user to resolve the print-setting conflicts, and the one or more replies include new selected print-setting options. For the example print job, the following describes example embodiments of messages and replies:

Print-setting-resolution device: "Hi, your print job ('ABC.docx', id:Z100134) includes conflicting settings because the selected paper size cannot be used with the selected staple position. Do you want to change the paper size?"

User device: "No."

Print-setting-resolution device: "Do you want to change the selected staple position?"

User device: "Yes."

Print-setting-resolution device: "The following are available staple positions: upper left, lower left, and saddle-stitch."

User device: "Upper left."

Print-setting-resolution device: "Thank you, staple position is changed to upper left."

Next, in block B645, the print-setting-resolution device changes the selected print-setting options according to the one or more replies and, in some embodiments, according to the one or more resolutions. For example, the one or more resolutions may be used when they do not conflict with the new selected print-setting options in the one or more replies. Also, if some resolutions have confidence scores that exceed the threshold, but these resolutions do not resolve every print-setting conflict, the print-setting-resolution device may change the selected print-setting options for the print-setting conflicts that have resolutions that have confidence scores that exceed the threshold according to the resolutions that have confidence scores that exceed the threshold, and the print-setting-resolution device may change the selected print-setting options for the print-setting conflicts that have resolutions that have confidence scores that do not exceed the threshold according to the new selected print-setting options in the one or more replies.

For the example print job, the print-setting-resolution device changes the staple position to upper left. The flow then moves to block B650.

In block B650, the print-setting-resolution device sends the print job to the image-forming device, and the flow ends in block B655.

Figure 7:
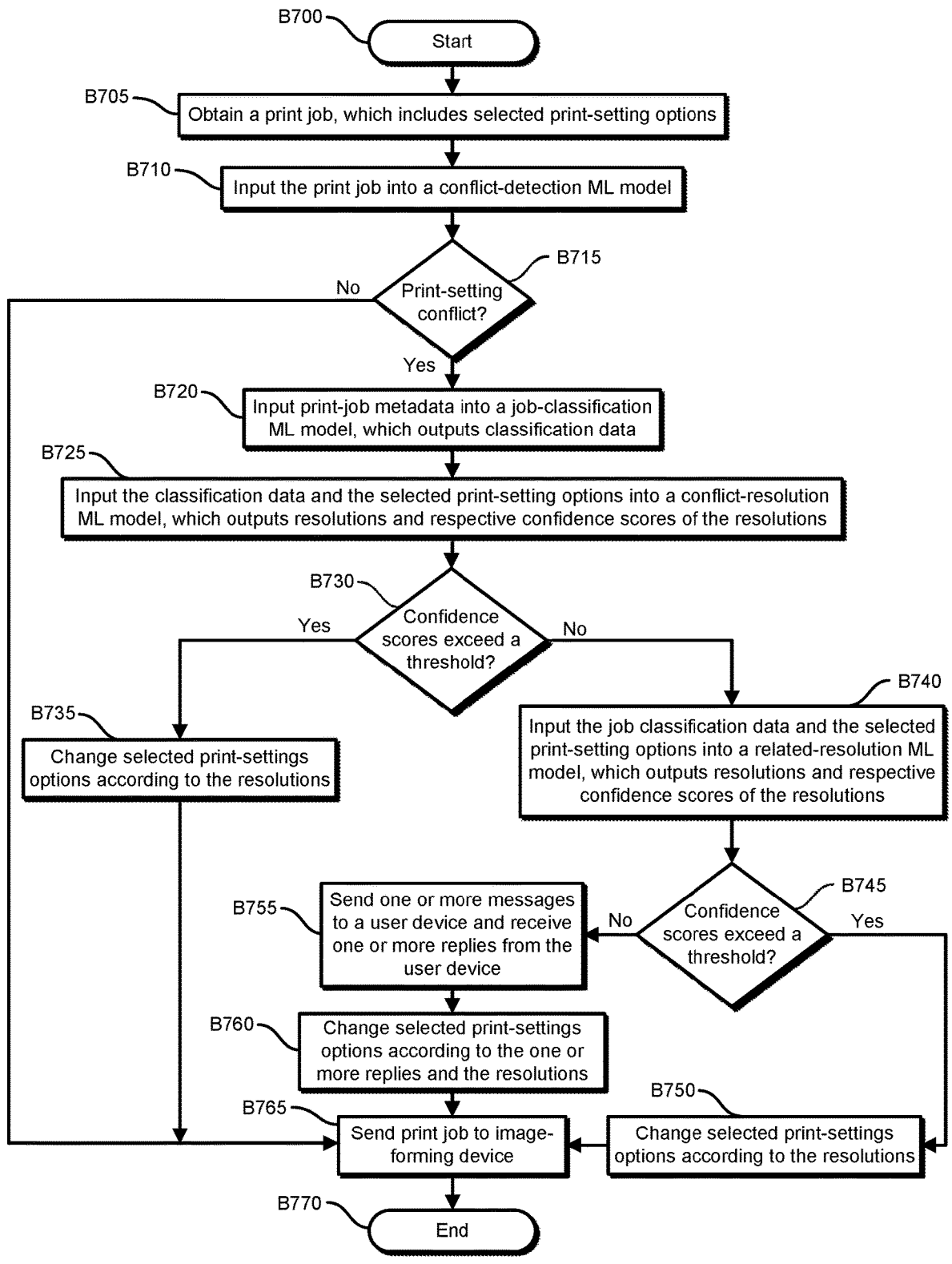
FIG. 7 illustrates an example embodiment of an operational flow for resolving print-setting conflicts.

FIG. 7 illustrates an example embodiment of an operational flow for resolving print-setting conflicts. The flow starts in block B700 and then moves to block B705, where a print-setting-resolution device obtains a print job, which includes one or more selected print-setting options.

Then, in block B710, the print-setting-resolution device inputs the print job into a conflict-detection machine-learning model, which outputs either (1) an indicator that the selected print-setting options have a conflict, or, alternatively, (2) an indicator that the selected print-setting options do not have a conflict.

Next, in block B715, the print-setting-resolution device determine whether the selected print-setting options have a conflict based on the output of the conflict-detection machine-learning model. If the print-setting-resolution device determines that the selected print-setting options do not have a conflict (B715=No), then the flow moves to block B765. If the print-setting-resolution device determines that the selected print-setting options do have a conflict (B715=Yes), then the flow moves to block B720.

In block B720, the print-setting-resolution device inputs the print-job metadata into a job-classification machine-learning model, which outputs classification data. The flow then moves to block B725, where the print-setting-resolution device inputs the classification data and the selected print-setting options into a conflict-resolution machine-learning model, which outputs resolutions and respective confidence scores of the resolutions.

Next, in block B730, the print-setting-resolution device determines if the confidence score of any resolution or resolution group exceeds a threshold. If the confidence score of at least one resolution or resolution group exceeds the threshold (B730=Yes), then the flow moves to block B735. If no resolution or resolution group has a confidence score that exceeds the threshold (B730=No), then the flow moves to block B740.

In block B735, the print-setting-resolution device changes the selected print-setting options of the print job according to the resolution or resolution group from B725 that has the highest confidence score, and then the flow proceeds to block B765.

In block B740, the print-setting-resolution device inputs the classification data and the selected print-setting options into a related-resolution machine-learning model, which outputs resolutions and respective confidence scores of the resolutions.

Next, in block B745, the print-setting-resolution device determines if the confidence score of any resolution or resolution group from block B740 exceeds a threshold. If the confidence score of at least one resolution or resolution group exceeds the threshold (B745=Yes), then the flow moves to block B750. If no resolution or resolution group has a confidence score that exceeds the threshold (B745=No), then the flow moves to block B755.

In block B750, the print-setting-resolution device changes the selected print-setting options of the print job according to the resolution or resolution group from B740 that has the highest confidence score, and then the flow proceeds to block B765.

In block B755, the print-setting-resolution device sends one or more messages to a user device and receives one or more replies from the user device. The one or more messages include one or more requests for input from the user to resolve the print-setting conflicts, and the one or more replies include new selected print-setting options. Next, in block B760, the print-setting-resolution device changes the selected print-setting options according to the new selected print-setting options in the one or more replies and, in some embodiments, according to the one or more resolutions from one or both of blocks B725 and B740, and then the flow moves to block B765.

In block B765, the print-setting-resolution device sends the print job to the image-forming device, and the flow ends in block B770.

Figure 8:
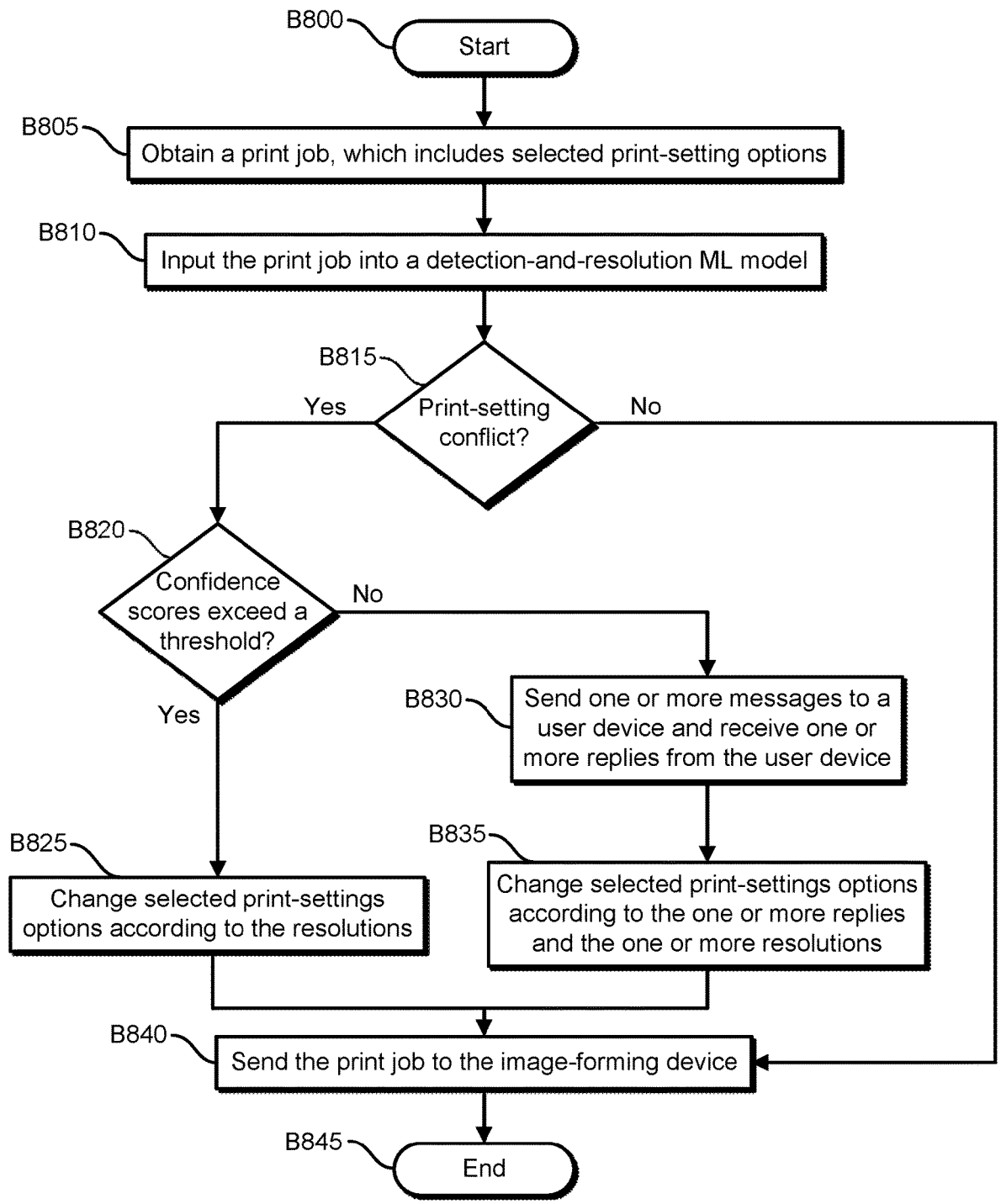
FIG. 8 illustrates an example embodiment of an operational flow for resolving print-setting conflicts.

FIG. 8 illustrates an example embodiment of an operational flow for resolving print-setting conflicts. The flow starts in block B800 and moves to block B805, where a print-setting-resolution device obtains a print job, which includes selected print-setting options.

Next, in block B810, the print-setting-resolution device inputs the print job into a detection-and-resolution machine-learning model, which detects whether the selected print-setting options of the print job have any conflicts and, if the selected print-setting options do include any conflicts, outputs one or more respective resolutions for each conflict and a respective confidence score of each resolution. Some embodiments of the detection-and-resolution machine-learning model accept the entire print job as an input, and some embodiments of the detection-and-resolution machine-learning model accept only the selected print-setting options of the print job as inputs.

The flow then moves to block B815, where the print-setting-resolution device determines whether the print job has any print-setting conflicts based on the output of the detection-and-resolution machine-learning model. If the print-setting-resolution device determines that the print job does not have any print-setting conflicts (B815=No), then the flow proceeds to block B840. If the print-setting-resolution device determines that the print job does have at least one print-setting conflict (B815=Yes), then the flow proceeds to block B820.

In block B820, the print-setting-resolution device determines whether any confidence score exceeds a threshold. If the print-setting-resolution device determines that at least one confidence score exceeds the threshold (B820=Yes), then the flow moves to block B825. If the print-setting-resolution device determines that no confidence score exceeds the threshold (B820=No), then the flow moves to block B830.

In block B825, the print-setting-resolution device changes the selected printing-setting options according to the resolution or resolution group that has the highest confidence score. From block B825, the flow moves to block B840.

In block B830, the print-setting-resolution device sends one or more messages to a user device and receives one or more replies from the user device. The one or more messages include one or more requests for input from the user to resolve the print-setting conflicts, and the one or more replies include new selected print-setting options. Next, in block B835, the print-setting-resolution device changes the selected print-setting options according to the new selected print-setting options in the one or more replies and, in some embodiments or in some circumstances, according to the one or more resolutions, and then the flow moves to block B840.

In block B840, the print-setting-resolution device sends the print job to the image-forming device, and the flow ends in block B845.

Figure 9:
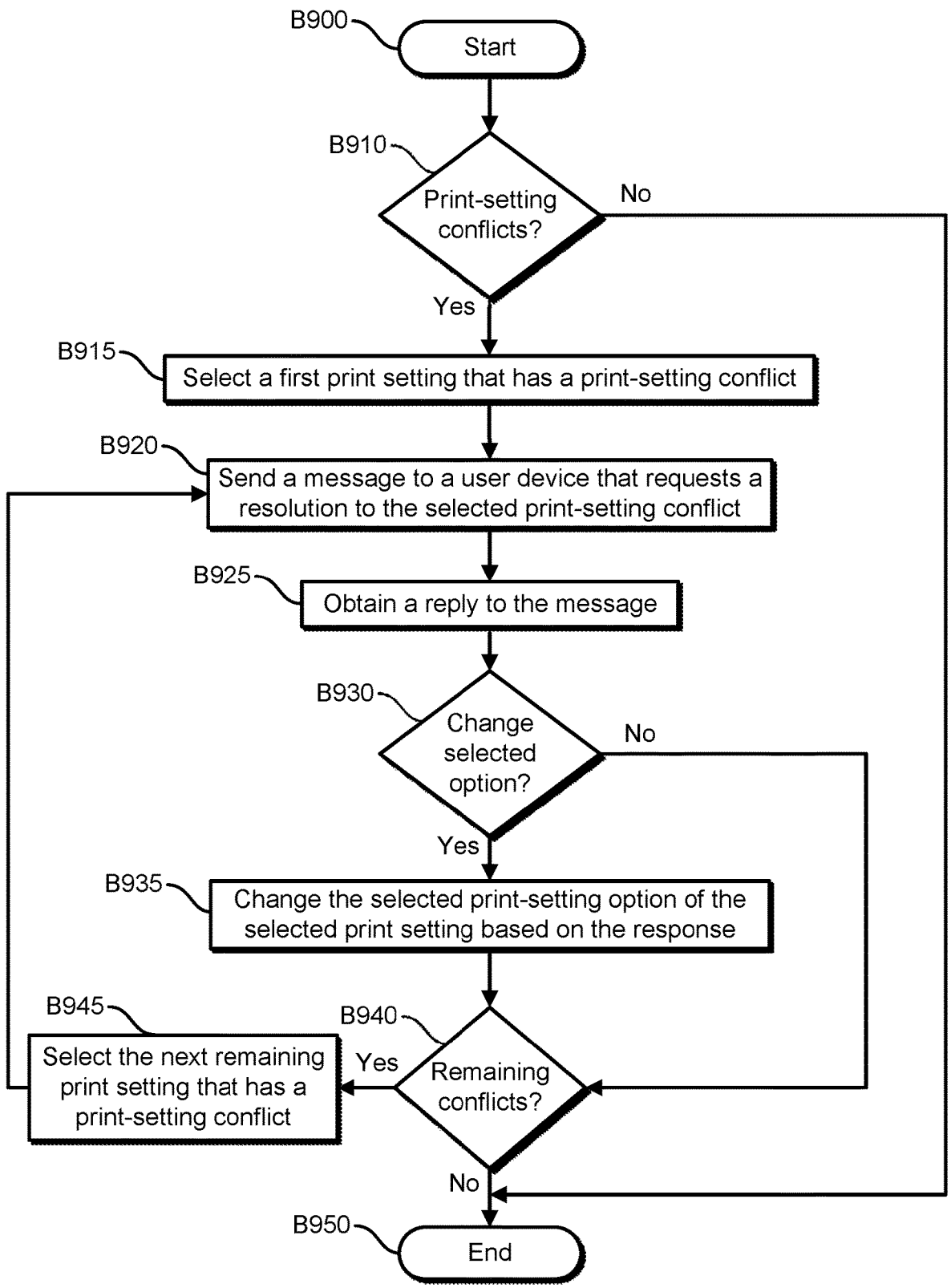
FIG. 9 illustrates an example embodiment of an operational flow for communicating with a user device.

FIG. 9 illustrates an example embodiment of an operational flow for communicating with a user device. For example, some embodiments of a print-setting-resolution device perform at least some of the operations in FIG. 9 when performing blocks B640-B645 in FIG. 6, when performing blocks B755-B760 in FIG. 7, or when performing blocks B830-B835 in FIG. 8.

The flow starts in block B900 and then proceeds to block B910, where a print-setting-resolution device determines whether a print job has any print-setting conflicts. If the print-setting-resolution device determines that the print job does not have any print-setting conflicts (B910=No), then the flow moves to block B950, where the flow ends. If the print-setting-resolution device determines that the print job does have at least one print-setting conflict (B910=Yes), then the flow moves to block B915.

In block B915, the print-setting-resolution device selects a first print setting that has a print-setting conflict. For example, each of the print settings may be assigned a respective priority, and the first print setting may be the highest priority print setting that has a print-setting conflict.

Then, in block B920, the print-setting-resolution device sends a message to a user device that requests a resolution to the selected print-setting conflict (the first print-setting conflict in the first iteration of B920). The message may include a list of the options for the print setting that has the print-setting conflict, and the message may ask the user if the user wants to change the selected option for the print setting that has the selected print-setting conflict. Also, in some embodiments, if the print-setting conflict is caused because a hardware component (e.g., a stapler, a duplexer) of the image-forming device has not been installed or enabled, the message may include instructions for installing or enabling the hardware component.

In block B925, the print-setting-resolution device obtains a response to the message. Next, in block B930, the print-setting-resolution device determines whether the response includes a change to the selected option of the selected print setting. If the print-setting-resolution device determines that the response includes a change to the selected option of the selected print setting (B930=Yes), then the flow moves to block B935. And, if the print-setting-resolution device determines that the response does not include a change to the selected option of the selected print setting (B930=No), then the flow moves to block B940.

In block B935, the print-setting-resolution device changes the selected print-setting option of the selected print setting based on the response. Then the flow proceeds to block B940.

In block B940, the print-setting-resolution device determines if any print-setting conflicts remain in the print job. In some circumstances, changing a selected print-setting option to resolve one print-setting conflict may also resolve another print-setting conflict. If the print-setting-resolution device determines that at least one print-setting conflict remains in the print job (B940=Yes), then the flow proceeds to block B945, where the print-setting-resolution device selects the next remaining print setting that has a print-setting conflict, and the flow returns to block B920. The print-setting-resolution device may make more than one pass through each of the print settings that has a conflict, for example when the replies fail to resolve all of the conflicts after a pass through each of the print settings that has a conflict. If the print-setting-resolution device determines that no print-setting conflict remains in the print job (B940=No), then the flow moves to block B950, where the flow ends.

Figure 10:
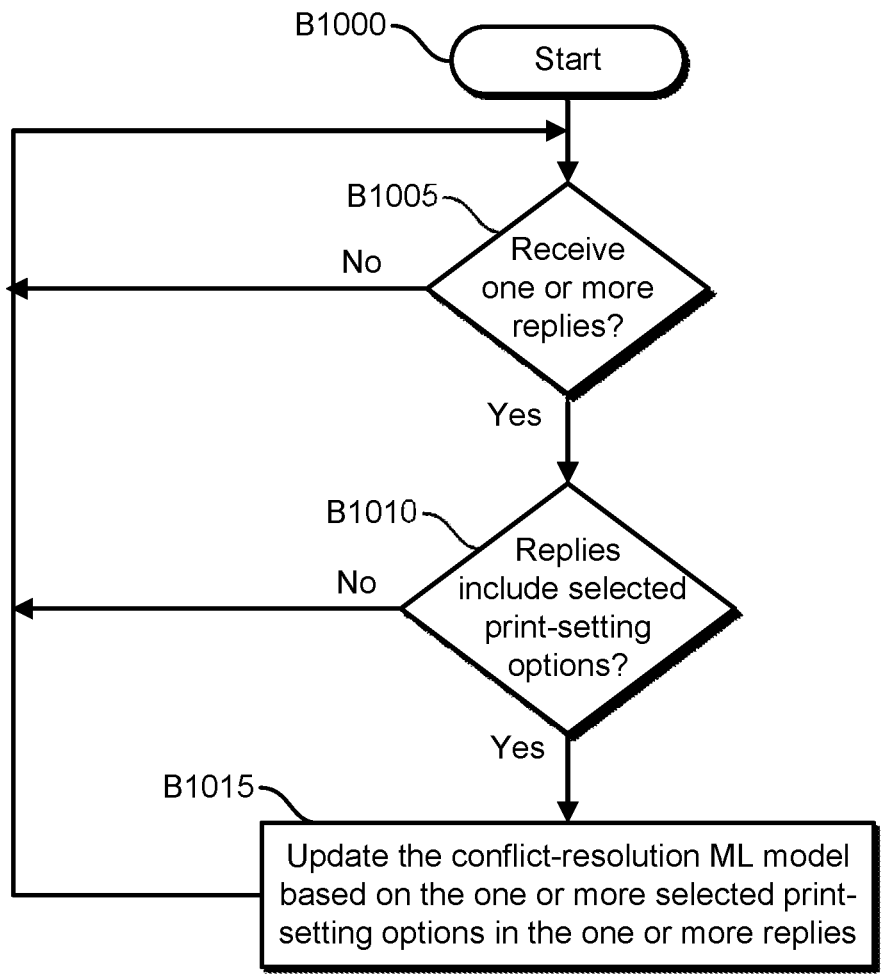
FIG. 10 illustrates an example embodiment of an operational flow for updating a conflict-resolution machine-learning model.

FIG. 10 illustrates an example embodiment of an operational flow for updating a conflict-resolution machine-learning model. The flow starts in block B1000 and then moves to block B1005, where a print-setting-resolution device determines if it has received one or more replies from a user device (e.g., a reply in block B640 in FIG. 6, a reply in block B755 in FIG. 7, a reply in block B830 in FIG. 8, and a reply in block B925 in FIG. 9). If the print-setting-resolution device has not received any reply from a user device (B1005=No), the flow returns to block B1005, and the print-setting-resolution device continues to wait for a reply. If the print-setting-resolution device has received one or more replies from a user device (B1005=Yes), the flow moves to block B1010.

In block B1010, the print-setting-resolution device determines if the one or more replies include one or more selected print-setting options. If the print-setting-resolution device determines that the one or more replies do not include any selected print-setting options (B1010=No), then the flow returns to block B1005. If the print-setting-resolution device determines that the one or more replies do include at least one selected print-setting option (B1010=Yes), then the flow returns to block B1015.

In block B1015, the print-setting-resolution device updates the conflict-resolution machine-learning model based on the one or more selected print-setting options in the one or more replies. For example, the print-setting-resolution device may use the selected print-setting options of the print job (which include at least one print-setting conflict) that is associated with the one or more replies and the one or more selected print-setting options in the one or more replies to further train the conflict-resolution machine-learning model. Also for example, some embodiments of the print-setting-resolution device use the one or more selected print-setting options in the one or more replies as the resolutions 4112 in FIG. 4A. Thus, some embodiments of the print-setting-resolution device continually update the conflict-resolution machine-learning model based on feedback from users.

FIG. 11 illustrates an example embodiment of resolutions and scores. In this embodiment, the resolutions and scores 1112 include three resolution groups, each of which includes at least two resolutions. Each resolution includes a selected option for a print setting. Also, each resolution group has a respective confidence score. If the resolutions and scores 1112 were output by a conflict-resolution machine-learning model based on input print-setting options, changing the input print-setting options according to all of the resolutions in a resolution group will eliminate any print-setting conflicts in the input print-setting options.

Figure 12:
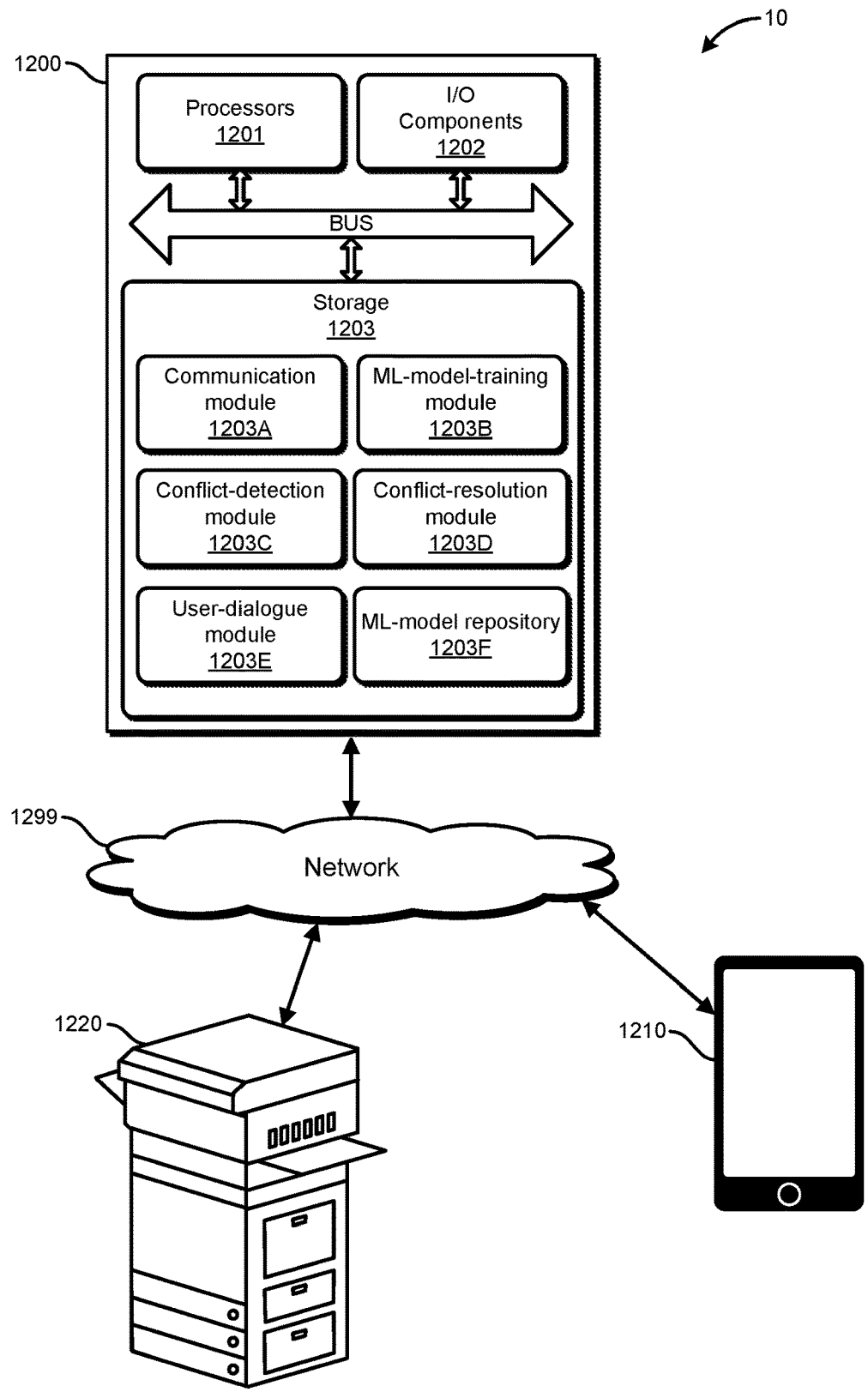
FIG. 12 illustrates an example embodiment of a printing system.

FIG. 12 illustrates an example embodiment of a printing system. The system 10 includes a print-setting-resolution device 1200, which is a specially-configured computing device; a user device 1210; and an image-forming device 1220. In this embodiment, the print-setting-resolution device 1200, the user device 1210, and the image-forming device 1220 communicate via one or more networks 1299. Also, in some embodiments of the system 10, the devices communicate via other wired or wireless channels.

The print-setting-resolution device 1200 includes one or more processors 1201, one or more I/O components 1202, and storage 1203. Also, the hardware components of the print-setting-resolution device 1200 communicate via one or more buses or other electrical connections. Examples of buses include a universal serial bus (USB), an IEEE 1394 bus, a Peripheral Component Interconnect (PCI) bus, a Peripheral Component Interconnect Express (PCIe) bus, an Accelerated Graphics Port (AGP) bus, a Serial AT Attachment (SATA) bus, and a Small Computer System Interface (SCSI) bus.

The one or more processors 1201 include one or more central processing units (CPUs), which may include microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits). The I/O components 1202 include communication components (e.g., a GPU, a network-interface controller) that communicate with the user device 1210, the network 1299, the image-forming device 1220, and other input or output devices (not illustrated), which may include a keyboard, a mouse, a printing device, a touch screen, a light pen, an optical-storage device, a scanner, a microphone, a drive, and a controller (e.g., a joystick, a control pad).

The storage 1203 includes one or more computer-readable storage media. As used herein, a computer-readable storage medium includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 1203, which may include both ROM and RAM, can store computer-readable data or computer-executable instructions.

The print-setting-resolution device 1200 also includes a communication module 1203A, a machine-learning-model-training module 1203B, a conflict-detection module 1203C, a conflict-resolution module 1203D, a user-dialogue module 1203E, and a machine-learning-model repository 1203F. A module includes logic, computer-readable data, or computer-executable instructions. In the embodiment shown in FIG. 12, the modules are implemented in software (e.g., Assembly, C, C++, C#, Java, BASIC, Perl, Visual Basic). However, in some embodiments, the modules are implemented in hardware (e.g., customized circuitry) or, alternatively, a combination of software and hardware. When the modules are implemented, at least in part, in software, then the software can be stored in the storage 1203. Also, in some embodiments, the print-setting-resolution device 1200 includes additional or fewer modules, the modules are combined into fewer modules, or the modules are divided into more modules.

The communication module 1203A includes instructions that, when executed, cause the print-setting-resolution device 1200 to communicate with other devices, including the user device 1210 and the image-forming device 1220, for example to obtain one or more print jobs from the user device 1210 or to send one or more print jobs to the image-forming device 1220. For example, some embodiments of the communication module 1203A include instructions that, when executed, cause the print-setting-resolution device 1200 to perform one or more of the operations that are described in blocks B505 and B530 in FIG. 5, one or more of the operations that are described in blocks B605 and B650 in FIG. 6, one or more of the operations that are described in blocks B705 and B765 in FIG. 7, or one or more of the operations that are described in blocks B805 and B840 in FIG. 8.

The machine-learning-model-training module 1203B includes instructions that, when executed, cause the print-setting-resolution device 1200 to train one or more machine-learning models, for example as described in block B301 in FIG. 3A, block B302 in FIG. 3B, block B401 in FIG. 4A, block B402 in FIG. 4B, and blocks B1000-B1015 in FIG. 10.

The conflict-detection module 1203C includes instructions that, when executed, cause the print-setting-resolution device 1200 to use a machine-learning model to detect whether the selected print-setting options in a print job have one or more print-setting conflicts, for example as described in blocks B510-B515 in FIG. 5, in blocks B610-B615 in FIG. 6, in blocks B710-B715 in FIG. 7, or in blocks B810-B815 in FIG. 8.

The conflict-resolution module 1203D includes instructions that, when executed, cause the print-setting-resolution device 1200 to use one or more machine-learning models to generate one or more resolutions (which may be organized in resolution groups) for any print-setting conflicts in respective print jobs and to modify the selected print-setting options of print jobs according to the one or more resolutions. In some embodiments, the instructions, when executed, also cause the print-setting-resolution device 1200 to use a machine-learning model to obtain classification information concerning a print job or to use a machine-learning model to generate respective confidence scores for each resolution or resolution group. For example, some embodiments of the conflict-resolution module 1203D includes instructions that, when executed, cause the print-setting-resolution device 1200 to perform one or more of the operations that are described in blocks B520-B525 in FIG. 5, one or more of the operations that are described in blocks B620-B635 in FIG. 6, one or more of the operations that are described in blocks B720-B750 in FIG. 7, or one or more of the operations that are described in blocks B810 and B820-B825 in FIG. 8.

The user-dialogue module 1203E includes instructions that, when executed, cause the print-setting-resolution device 1200 to send messages to the user device 1210 concerning print-setting conflicts and to receive one or more replies from the user device 1210 that include one or more resolutions, for example as described in blocks B640-B645 in FIG. 6, in blocks B755-B760 in FIG. 7, in blocks B830-B835 in FIG. 8, or in blocks B900-B950 in FIG. 9. In some embodiments, user-dialogue module 1203E includes instructions that, when executed, cause the print-setting-resolution device 1200 to implement a chatbot, to send one or more SMS messages, or to send one or more emails.

The machine-learning-model repository 1203F stores one or more machine learning models, for example a conflict-detection machine-learning model, a job-classification machine-learning model, a conflict-resolution machine-learning model, a detection-and-resolution machine-learning model, and a related-resolution machine-learning model.

Figure 13:
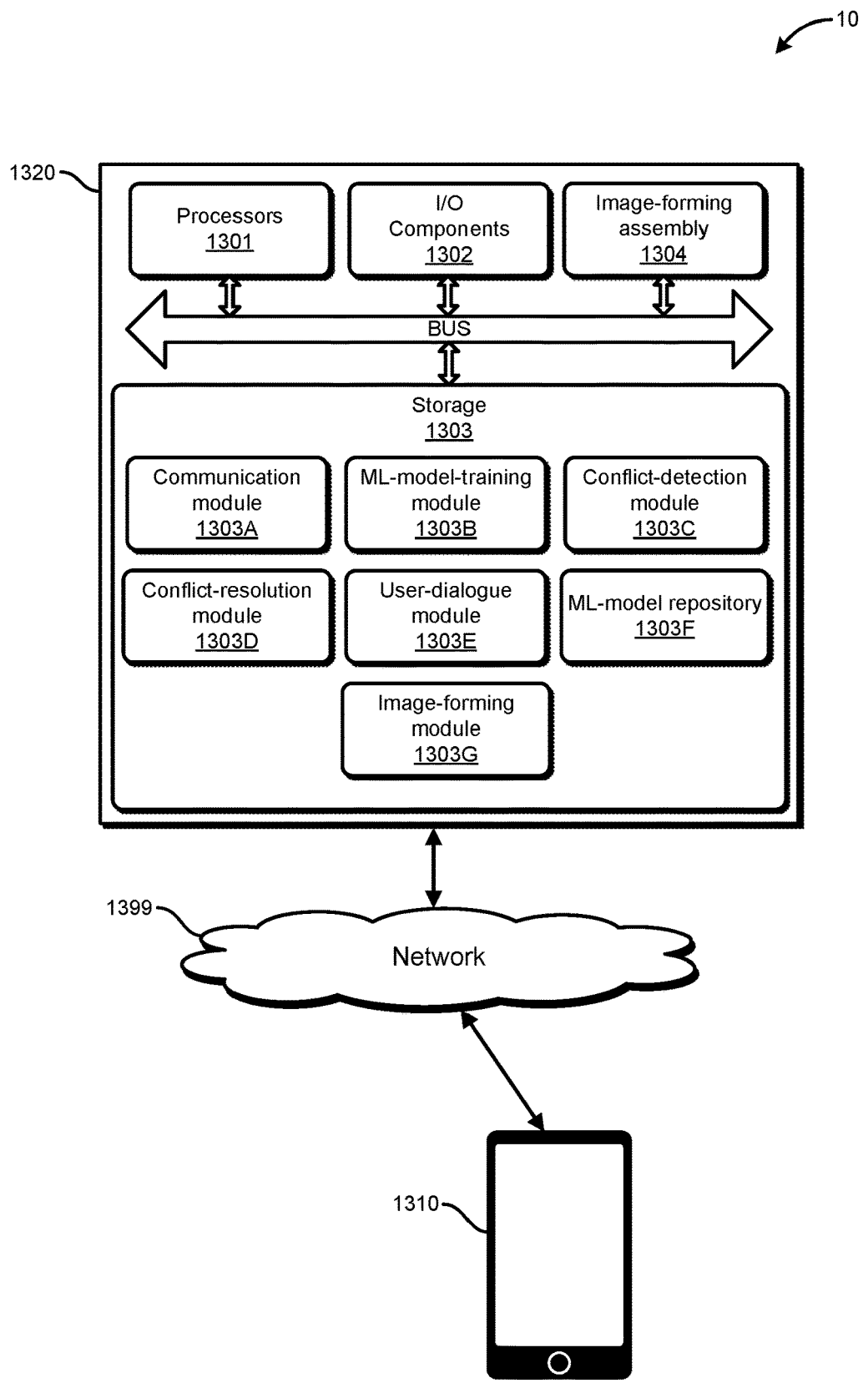
FIG. 13 illustrates an example embodiment of a printing system.

FIG. 13 illustrates an example embodiment of a printing system 10. The printing system 10 includes a user device 1310 and an image-forming device 1320. In this embodiment, the image-forming device 1320 includes one or more processors 1301, one or more I/O components 1302, storage 1303, and an image-forming assembly 1304, which is an assembly that is configured to form images on one or more media. For example, the image-forming assembly 1304 can include ink cartridges, toner cartridges, paper rollers, heaters, print heads, and fusers.

The storage includes a communication module 1303A, a machine-learning-model-training module 1303B, a conflict-detection module 1303C, a conflict-resolution module 1303D, a user-dialogue module 1303E, a machine-learning-model repository 1303F, and an image-forming module 1303G. Thus, in this embodiments, the image-forming device 1320 operates as a print-setting-resolution device.

Also, the image-forming module 1303G includes instructions that, when executed, cause the image-forming device 1320 to control the image-forming assembly 1304 to form images on one or more media.

Figure 14:
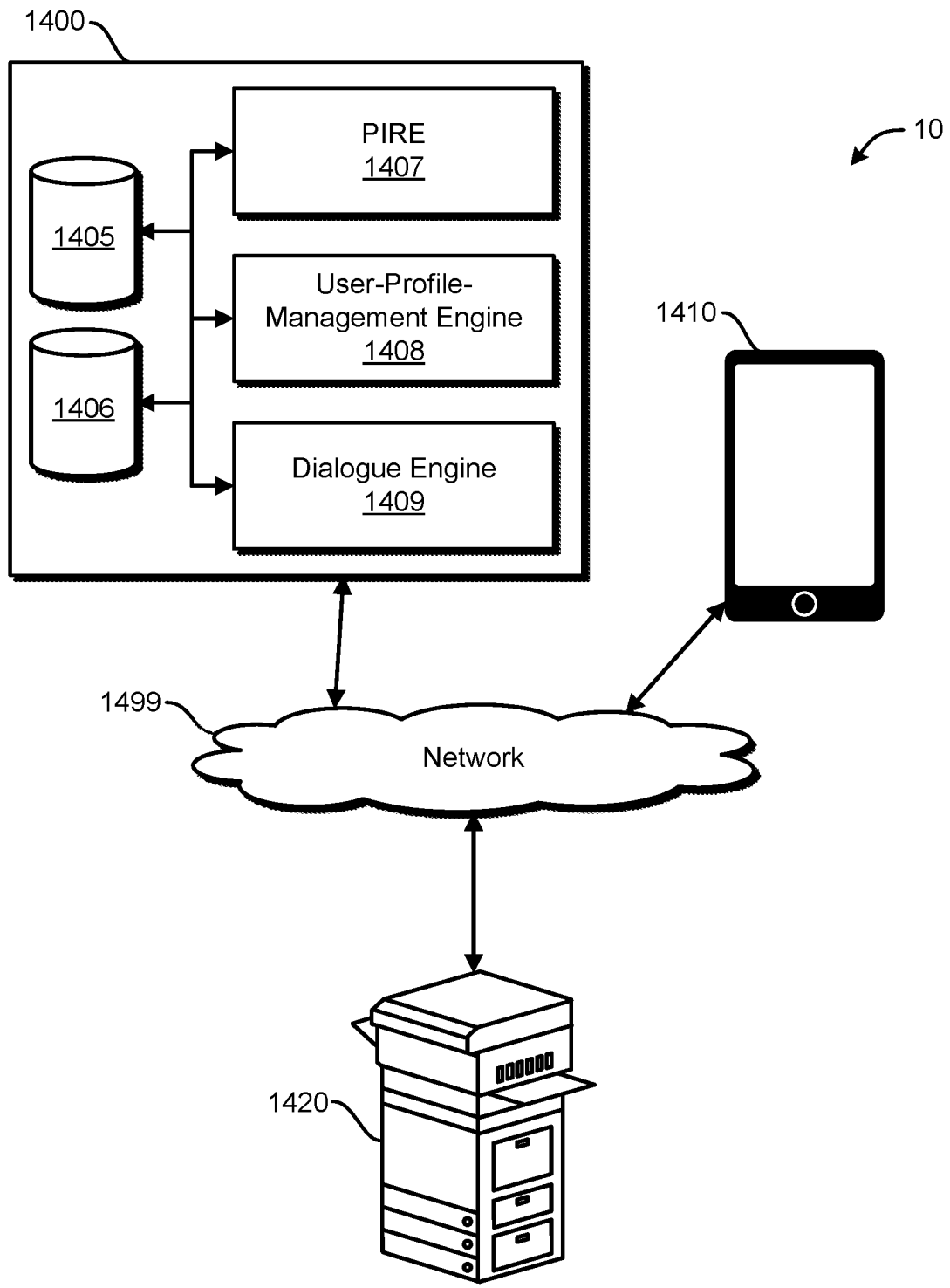
FIG. 14 illustrates the functional configuration of an example embodiment of a printing system.

FIG. 14 illustrates the functional configuration of an example embodiment of a printing system 10. The system 10 includes a print-setting-resolution device 1400, a user device 1410, and an image-forming device 1420.

The print-setting-resolution device 1400 includes the following: a job-resolution database 1405, which stores one or more machine-learning models; a job-negotiation database 1406, which stores information for contacting the user device; a print-intent-resolution engine (P IRE) 1407; a user-profile-management engine 1408; and a dialogue engine 1409.

The PIRE 1407 may include or implement one or more of the functions of the machine-learning-model-training module 1203B, the conflict-detection module 1203C, and the conflict-resolution module 1203D in FIG. 12. The user-profile-management engine 1408 may manage user information, for example user names, user groups, enterprise information, and user permissions. The dialogue engine 1409 may include or implement the functions of the user-dialogue module 1203E in FIG. 12. For example, the dialogue engine 1409 may implement a chatbot that communicates with the user device 1210.

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

The invention claimed is:

1. A device comprising:
  one or more computer-readable storage media; and
  one or more processors in communication with the one or more computer-readable storage media, wherein the one or more computer-readable storage media and the one or more processors are configured to cause the device to
    obtain a print job, wherein the print job includes printing content, a plurality of respective selected print-settings options for a plurality of print settings, and print-job metadata,
    determine if the print job includes one or more print-setting conflicts based on the plurality of selected print-settings options and on a first machine-learning model, wherein the first machine-learning model accepts the selected print-settings options as inputs and outputs an indicator that indicates whether the print job includes one or more print-setting conflicts, and generate respective resolutions that include a respective resolution for each of the one or more print-setting conflicts based on a second machine-learning model, wherein the second machine-learning model accepts the plurality of selected print-settings options as inputs, and wherein the second machine-learning model outputs the respective resolutions.

2. The device of claim 1,
wherein the one or more computer-readable storage media and the one or more processors are further configured to cause the device to generate classification data for the print job based on the print-job metadata and on a third machine-learning model,
and wherein the third machine-learning model accepts the print-job metadata as inputs.

3. The device of claim 2,
wherein the print-job metadata includes a user identifier, and
wherein the one or more computer-readable storage media and the one or more processors are further configured to cause the device to store the respective resolutions in association with the user identifier in the one or more computer-readable storage media.

4. The device of claim 1, wherein the print-job metadata includes a user identifier, a print-job name, an originating device, a date, a time, and a print device.

5. The device of claim 1, wherein the plurality of print settings include page size, duplex, borderless, staple, color, collate, hole punch, binding, and print resolution.

6. The device of claim 1, wherein the one or more computer-readable storage media and the one or more processors are further configured to cause the device to generate confidence scores that include a respective confidence score for each of the respective resolutions, and
wherein the second machine-learning model outputs the confidence scores.

7. The device of claim 6, wherein the one or more computer-readable storage media and the one or more processors are further configured to cause the device to determine if any of the confidence scores exceed a threshold.

8. The device of claim 6, wherein the one or more computer-readable storage media and the one or more processors are further configured to cause the device to
determine whether to contact a user based on the confidence scores;
in a case where the device determines to contact the user, send a message to a user device requesting a resolution, obtain a resolution response from the user device, wherein the resolution response includes one or more selected print-setting options, and
modify the respective resolutions based on the resolution response; and
in a case where the device determines not to contact the user,
modify the print job based on the respective resolutions.

9. The device of claim 8, wherein the one or more computer-readable storage media and the one or more processors are further configured to cause the device to update the second machine-learning model based on the resolution response.

10. A method comprising:
obtaining a print job, wherein the print job includes printing content, a plurality of respective selected print-settings options, each of which corresponds to one of a plurality of print settings, and print-job metadata;
inputting the plurality of respective selected print-settings options into a first machine-learning model that outputs either (i) an indicator that the print job includes one or more print-setting conflicts or (ii) an indicator that the print job does not include any print-setting conflicts;
inputting the plurality of respective selected print-settings options into a second machine-learning model that outputs respective resolutions that include updated print-setting options that resolve each of the one or more print-setting conflicts; and
modifying the plurality of respective selected print-settings options based on the respective resolutions.

11. The method of claim 10, wherein the second machine-learning model outputs a respective confidence score for each of the respective resolutions; and
wherein the method further comprises:
determining whether to send a communication to a user device based on the confidence scores;
in a case where the determining determines to send the request to the user device,
sending a communication to the user device,
obtaining a reply from the user device, and
modifying the respective resolutions based on the reply; and
in a case where the determining determines not to send the request to the user device,
changing at least one of the plurality of respective selected print-settings options to one of the updated print-settings options included in the respective resolutions.

12. The method of claim 11, further comprising, in the case where the determining determines to send the communication to the user device, modifying the second machine-learning model based on the reply.

13. The method of claim 11, further comprising:
determining one or more attributes for the print job that are not included in the print job based on a third machine-learning model; and
inputting the one or more attributes to the second machine-learning model.

14. One or more computer-readable storage media storing instructions that, when executed by one or more computing devices, cause the one or more computing devices to perform operations comprising:
storing a first machine-learning model and a second-machine learning model;
obtaining a print job, wherein the print job includes printing content, selected print-settings option that include a respective selected print-settings option for each of a plurality of print settings, and print-job metadata;
inputting the selected print-settings options to the first machine-learning model, which outputs an indicator that indicates whether the print job includes any print-setting conflicts;
inputting the selected print-settings options into the second machine-learning model, which outputs one or more recommended print-setting options; and
based on the one or more recommended print-setting options, performing one or both of changing at least one of the selected print-settings options according to the one or more recommend print-setting options and sending a message to a user-interface device.

15. The one or more computer-readable media of claim 14, wherein the second machine-learning model further outputs a respective confidence score for each of the one or more recommended print-setting options.

16. The one or more computer-readable media of claim 15, wherein the first machine-learning model is a linear-regression model.

17. The one or more computer-readable media of claim 14, wherein the operations further comprise:

obtaining a reply in response to sending the message to the user-interface device, wherein the reply include one or more revised print-setting options, changing at least one of the selected print-settings options according to the one or more revised print-setting options, and modifying the second machine-learning model based on the one or more revised print-setting options.

18. The one or more computer-readable media of claim 14, wherein the operations further comprise:

storing a third machine-learning model, wherein the third machine-learning model accepts the print-job metadata as inputs and outputs one or more classifications for the print job that are not included in the print job;

inputting the print-job metadata into the third machine-learning model, which outputs the one or more classifications for the print job; and inputting the one or more classifications into the second machine-learning model.

\* \* \* \* \*